Patented July 29, 1952

2,605,211

UNITED STATES PATENT OFFICE 2,605,211

RECOVERING ANTIMONY TRICHLORIDE FROM HYDROCARBON EXTRACT PHASE

John F. Deters, Valparaiso, Ind., assignor to Standard Oil Company, Chicago, Ill., a corporation of Indiana Application November 26, 1949, Serial No. 129,558

4 Claims. (Cl. 196—13)

This invention relates to the extraction of hydrocarbon oils such as petroleum napthas, gasoline, kerosene, gas oil, cycle gas oil from cracking operations, etc., and more particularly it relates to a process of extracting such oils with antimony trichloride solvent. It is well known to extract petroleum oils with antimony trichloride, such a process being described in U. S. Patent 2,322,083, June 15, 1943. One of the problems in the use of this solvent commercially is the recovery of the solvent from the raffinate and the extract for recycle in the process.

It is an object of this invention to improve the recovery of antimony trichloride solvent from the extract, thereby reducing the cost of this operation. It is another object of the invention to reduce the amount of water required for antimony trichloride recovery. A still further object of the invention is to reduce the amount of acid-resistant equipment required for antimony trichloride recovery.

The invention is illustrated by drawings which show in

Figure 1:
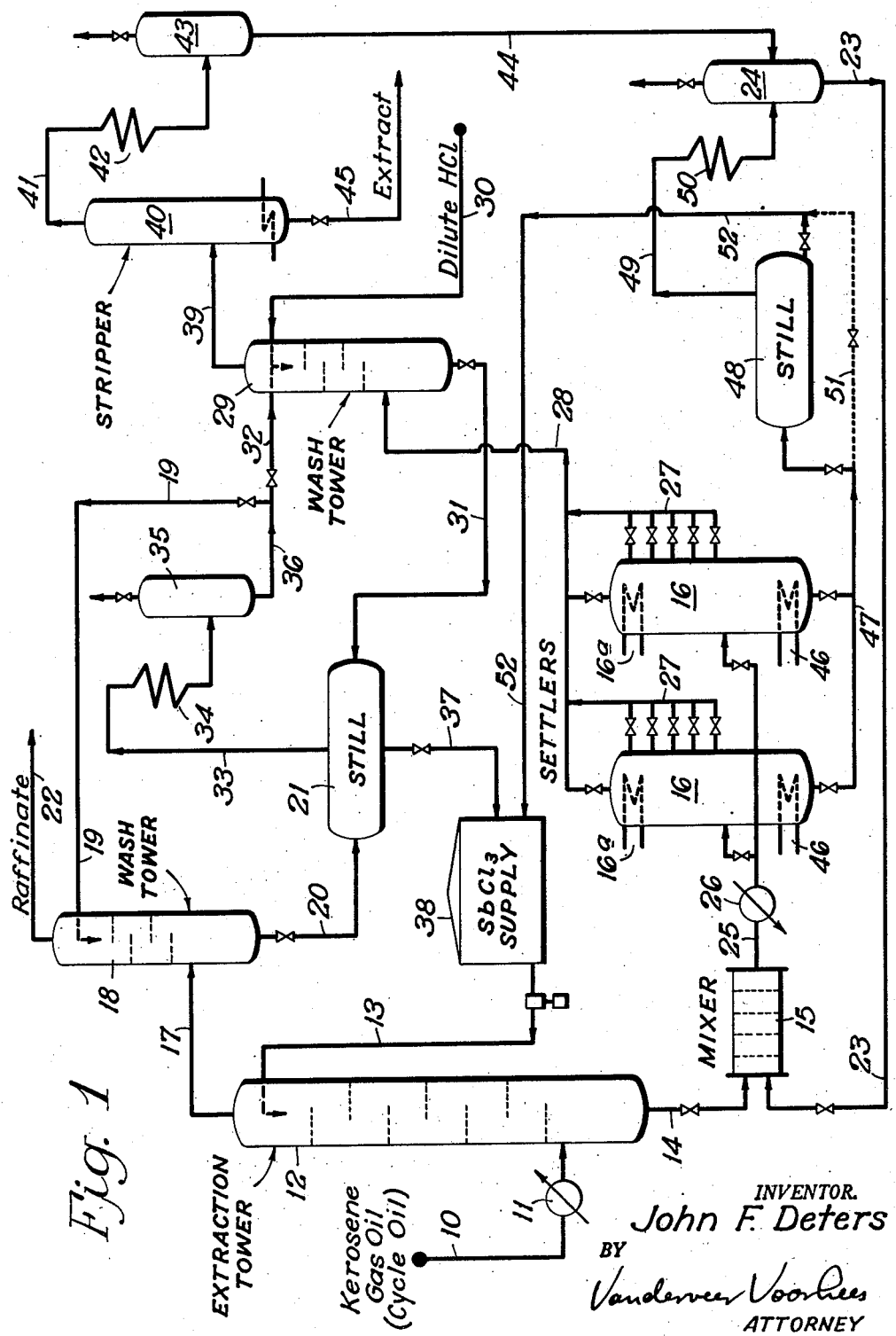

Figure 1 an apparatus suitable for carrying out the process; and in

Figure 2:
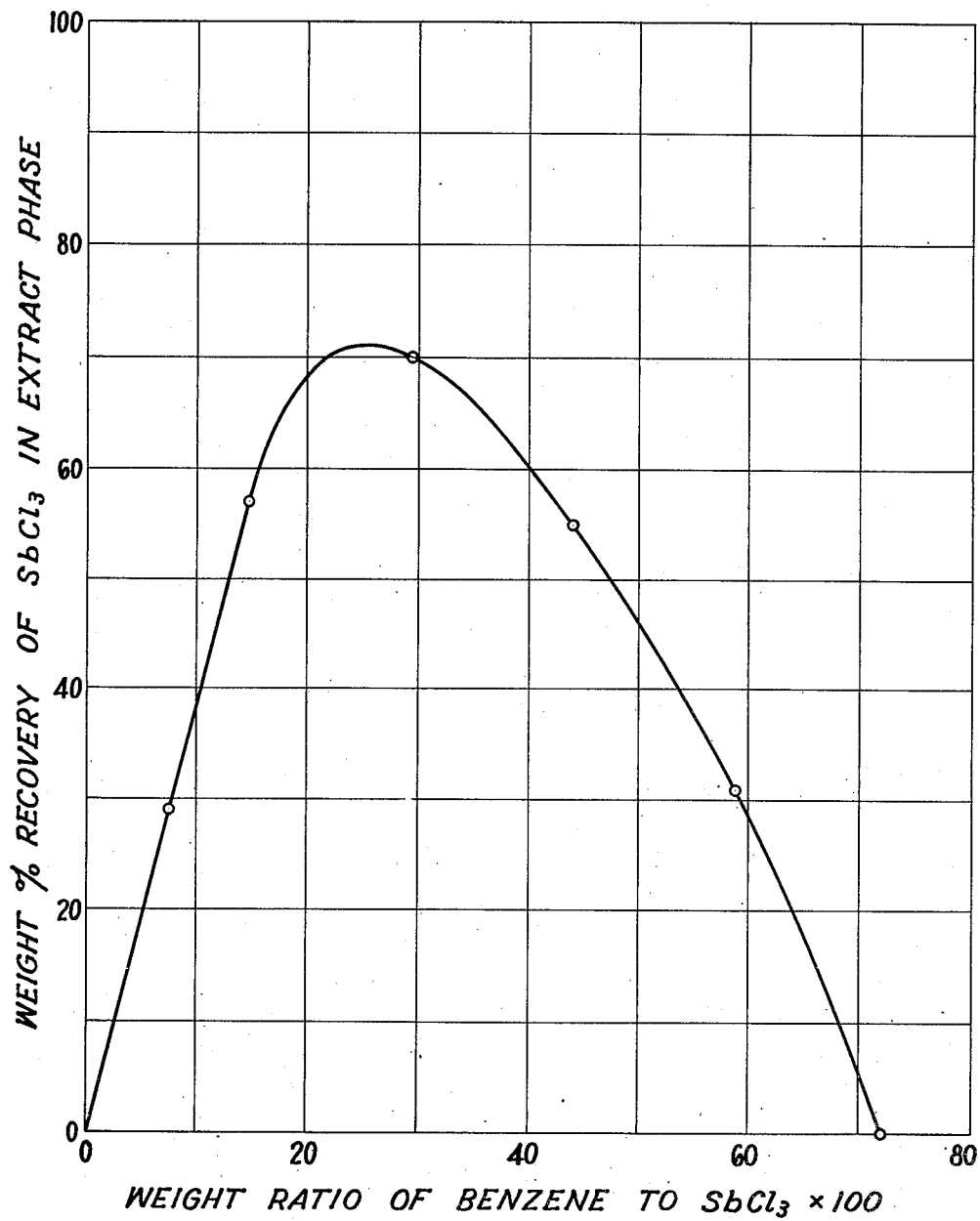

Figure 2 a graph of data typical of one phase of the process.

I have discovered that addition of benzene to the extract obtained from antimony trichloride extraction of mineral oils results in the separation of antimony trichloride as a solid phase at ordinary temperature, e. g. about 25° C. I have also found that the amount of benzene required to effect a maximum separation of antimony trichloride is about 10 to 45 per cent of the weight of the $SbCl_3$ in the extract phase, preferably about 20 to 35 per cent. By adding benzene in this amount, I have found it possible to separate as much as 70 per cent of the $SbCl_3$ from the extract as a crystalline solid which can be melted and recycled to the process without further treatment, thereby reducing the amount of $SbCl_3$ remaining to be recovered from the extract to only one-third the amount previously required to be recovered. Some increase in $SbCl_3$ separation can be obtained by operating at lower temperatures, e. g. 0 to 15° C., but this operation requires refrigeration and is not necessary for good results.

There are various ways of applying benzene crystallization to the antimony trichloride extraction process. The drawing, Figure 1, shows one method by which the process may be carried out. Referring to the drawing, a suitable charging stock, for example, kerosene, gas oil or cracking still cycle oil, is introduced by line 10 to the heater 11 and thence into extraction tower 12. $SbCl_3$ is introduced at an elevated point in the tower by line 13. It is desirable to maintain the temperature of the tower above the point at which $SbCl_3$ will solidify. A temperature of 35 to 60° C. is commonly sufficient for, altho the melting point of pure $SbCl_3$ is 73.4° C., the stream thru line 13 is usually not pure and the solvent quickly absorbs constituents from the oil in tower 12 which lower its melting point.

Because of the high density of the $SbCl_3$ solvent, it cascades rapidly down thru the extraction tower over suitable baffles or other contacting material and collects in the bottom of the tower from which it is withdrawn by line 14 leading to mixer 15 and receivers 16. The oil passes up thru tower 12 and is withdrawn by line 17 leading to raffinate washer 18 where any dissolved or entrained $SbCl_3$ is removed by a stream of dilute HCl introduced at 19 and withdrawn by line 20 leading to $SbCl_3$ recovery still 21. The washed raffinate is withdrawn from the process by line 22.

The ratio of $SbCl_3$ solvent to oil treated is usually about 50 to 200 per cent by weight and the major part of the $SbCl_3$ forms an extract phase with aromatic constituents of the oil treated. It has heretofore been the practice to wash the extract phase with dilute HCl to recover the $SbCl_3$ in aqueous solution. Distillation of the hydrocarbons from the extract is not feasible because of undesirable polymerization reactions which take place at the temperature of distillation and because of the relatively high volatility of $SbCl_3$.

According to my process, I introduce benzene in the proportion of about 10 to 45 weight per cent based on $SbCl_3$ in the extract in mixer 15, line 23 being used to conduct the benzene from supply 24. The benzene-extract solution then passes by line 25 thru cooler 26 and into one of the receivers 16 where it may be further cooled by coils 16a while the $SbCl_3$ precipitates as a crystalline mass, apparently in the form of a benzene complex. At 25° C. I may separate in settler 16 as much as 70 per cent of the $SbCl_3$ in the extract phase.

After settling of the SbCl₃, the extract layer is withdrawn by manifolds 27 and line 28 leading to extract washer 29 where the extract is contacted with a stream of dilute HCl introduced by line 30 and the recovered SbCl₃ in aqueous solution is conducted by line 31 to still 21 for removal of water. Steam and hydrochloric acid are conducted by vapor line 33 to condenser 34 and thence to receiver 35 from which the dilute HCl may be recycled in the process by lines 32 and 36. The anhydrous liquid SbCl₃ obtained in still 21 is conducted by line 37 to SbCl₃ supply tank 38 from which it may be withdrawn by line 13 and recycled in the process.

Washed extract from washer 29 is conducted by line 39 to stripper 40 where benzene is stripped off thru vapor line 41, condensed in coil 42 running into receiver 43, whence the recovered benzene passes by line 44 to benzene supply 24. The washed and stripped extract is withdrawn from the process by line 45.

Crystalline SbCl₃ in receiver 16 is melted by steam coils 46 and withdrawn by line 47 to still 48 where occluded benzene can be driven off to vapor line 49 leading to condenser 50 and thence to benzene supply 24. It is not always necessary to recover the benzene from the separated SbCl₃, particularly if efficient means of separating the solidified solvent are employed such as filtration or centrifugal separation. In that case, still 48 may be suitably bypassed by broken line 51 as shown in the drawing. Recovered SbCl₃ is conducted by line 52 to supply tank 38 for further use in the process.

As an example of the application of my process to an aromatic-containing petroleum stock for recovery of aromatics, a light catalytically cracked cycle stock obtained from the fluid catalyst cracking process was extracted with 30 volume per cent (108 weight per cent) of SbCl₃ at 25° C. The raffinate phase contained 54.8 per cent by weight of the oil and 11.7 per cent by weight of the SbCl₃. The remainder of the SbCl₃ was found in the extract phase, i. e. 88.3 weight per cent of the total or 68 per cent of the weight of the extract. The addition of 18 per cent by weight of benzene to the extract (25.5% based on SbCl₃) resulted in the separation of slightly more than 70 per cent of the SbCl₃ therein. The extract oil, after removal of remaining antimony trichloride and benzene, was highly aromatic in character as indicated by a refractive index of 1.5483, whereas the refractive index of the raffinate fraction was 1.4600 showing that it was largely non-aromatic in character. The sulfur analysis was: Extract—2.05%; raffinate—0.32%.

Figure 2 of the drawing shows the amount of SbCl₃ expressed in percentage which is caused to crystallize by the addition of varying amounts of benzene to the extract from the light catalytic cycle oil just described. The temperature of separation was 25° C.

Another extraction at 25° C. of light cycle oil from catalytic cracking using 20 per cent by volume of SbCl₃ based on the oil treated gave an extract yield of 39 per cent by volume. The properties of the feed, extract and raffinate fractions obtained are given below:

| | Feed | Extract | Raffinate |
|---|---|---|---|
| Refractive Index $N_D^{20}$ | 1.4967 | 1.5408 | 1.4686 |
| Sulfur | 1.10 | 2.04 | 0.46 |

Having thus described my invention, what I claim is:

1. In a process wherein a hydrocarbon oil is extracted with antimony trichloride under conditions to form a raffinate phase containing only a minor amount of antimony trichloride and an extract phase containing most of the antimony trichloride, the method of removing the antimony trichloride from the extract phase which comprises adding to the extract at a temperature in the range of 0° C. to 25° C. about 10 to 45 per cent of benzene, based on the weight of antimony trichloride in said extract, thereby causing the crystallization of a solid antimony trichloride material, separating said solid antimony trichloride material from the remaining liquid extract and separately removing the remaining antimony trichloride from the remaining extract.

2. The method of claim 1 which includes the further step of cooling the extract together with added benzene to a temperature in the range of 0° to 15° C. before separating solid antimony trichloride material from the remaining liquid extract.

3. The method of claim 1 which includes the steps of stripping benzene from separated solid antimony trichloride material to separate benzene from antimony trichloride, recycling antimony trichloride in liquid form to the extraction step and recycling benzene for contacting further extract material.

4. The method of claim 1 which includes the steps of cooling the mixture of added benzene and extract to increase the amount of antimony trichloride material solidified, separating the solidified antimony trichloride material from liquid extract material, distilling benzene from antimony trichloride material to obtain benzene and molten antimony trichloride, recycling the molten antimony trichloride to the extraction step and recycling the benzene for contact with further extract.

JOHN F. DETERS.

REFERENCES CITED

The following references are of record in the file of this patent:

UNITED STATES PATENTS

| Number | Name | Date |
|---|---|---|
| 2,246,257 | Kohn | June 17, 1941 |
| 2,322,083 | Plas | June 15, 1943 |